METHOD AND APPARATUS FOR VIBRATORY DRILLINGS

Original Filed June 24, 1954

Clarence W. Brandon
INVENTOR.
BY Head & Johnson
Attorneys

METHOD AND APPARATUS FOR VIBRATORY DRILLINGS

Clarence W. Brandon
INVENTOR.

BY James R. Head
Attorneys

Nov. 15, 1966 C. W. BRANDON 3,285,349

METHOD AND APPARATUS FOR VIBRATORY DRILLINGS

Original Filed June 24, 1954 9 Sheets-Sheet 3

Clarence W. Brandon
INVENTOR.

BY Head & Johnson
Attorneys

Nov. 15, 1966 C. W. BRANDON 3,285,349

METHOD AND APPARATUS FOR VIBRATORY DRILLINGS

Original Filed June 24, 1954 9 Sheets-Sheet 4

Clarence W. Brandon
INVENTOR.

BY Head & Johnson
Attorneys

Clarence W. Brandon
INVENTOR.
BY Head & Johnson
Attorneys

Clarence W. Brandon
INVENTOR.

BY Head & Johnson
Attorneys

Clarence W. Brandon
INVENTOR.

BY Head & Johnson
Attorneys

METHOD AND APPARATUS FOR VIBRATORY DRILLINGS

Original Filed June 24, 1954

Clarence W. Brandon
INVENTOR.

BY Head & Johnson
Attorneys

Nov. 15, 1966 C. W. BRANDON 3,285,349

METHOD AND APPARATUS FOR VIBRATORY DRILLINGS

Original Filed June 24, 1954

9 Sheets-Sheet 9

Clarence W. Brandon

INVENTOR.

BY Head & Johnson

Attorneys

United States Patent Office 3,285,349

Patented Nov. 15, 1966

3,285,349
METHOD AND APPARATUS FOR VIBRATORY DRILLINGS

Clarence W. Brandon, Tallahassee, Fla., assignor of twelve and one-half percent to Orpha B. Brandon, Birmingham, Ala., five percent to Harvey B. Jacobson, Washington, D.C., and fifty percent to N. A. Hardin, Catherine H. Newton, and Hazel H. Wright, jointly, all of Forsyth, Ga.

Original application June 24, 1954, Ser. No. 438,371, now Patent No. 3,138,213, dated June 28, 1964. Divided and this application June 1, 1964, Ser. No. 392,361
7 Claims. (Cl. 175—55)

This application is a division of application Serial No. 438,371, filed June 24, 1954, now Patent No. 3,138,213.

This invention comprises novel and useful improvements in a method and apparatus for rotary vibratory drilling and more specifically pertains to the use of torsional vibrations of a drilling stem for securing a greater efficiency in the operation of drilling tools.

The principal object of this invention is to provide apparatuses and methods which will improve the operation of drilling and especially the drilling of deep wells, such as oil wells, by enabling the drilling mechanism to make a hole faster, and in all types of formations.

A very important object is to provide apparatus and methods of drilling, which in contrast to the conventional method of rotary drilling, will drill as rapidly at the start of a hole as during the later stages.

A further object is to provide apparatuses and methods to attain the foregoing object with the use of conventional drilling tools.

A still further object of the invention is to provide apparatuses and methods for realizing the first mentioned object with the use of conventional rotary drilling rigs; and with the use of conventional drilling tools therewith.

A further object is to provide apparatuses and methods which will obtain in a single drilling apparatus and method the advantages of percussion drilling and of rotary drilling in a single drilling operation.

A still further important object of the invention is to provide an improvement in the process of drilling and in apparatuses for the same whereby to obtain a superior cutting and penetrating action of the drill by distributing its cutting and rupturing action upon the formation over substantially the entire bottom of the hole.

Another very important object of the invention is to apply torsional oscillatory vibrations to the drilling stem for increasing the rotational cutting of the formation and the penetration of the formation by the drill bit.

A still further important object of the invention is to provide an apparatus and method in accordance with the immediately preceding object and which will obtain periodic percussional impacts of the drill to the formation during the rotation of the drill bit.

An additional important object is to provide an apparatus and method for effecting the immediately preceding object by torsional oscillatory action of the drilling stem.

Yet another important object of the invention is to provide an apparatus and method in accordance with the preceding objects in which the pressure of the drilling fluid constitutes a source of power for attaining the aforesaid objects.

Another object of the invention is to utilize the drill bit and the drilling mud in a novel manner as a means for imparting periodic pressure pulsations to the bottom of the hole to facilitate fracturing and penetration of the formation by the drill bit.

Another important object of the invention is to provide an apparatus and process wherein the action of the drill bit roller teeth are utilized to cause a high frequency periodic pulsation in the pressure of the drilling mud and to apply these pulsations to the formation to facilitate the rupturing and penetration of the same by the drill bit.

An additional object of the invention is to provide an eccentric mounting construction for the drill bit roller teeth, whereby rotation of the latter will increase torsional oscillatory vibration of the drill stem; and in both directions of oscillatory movement of the same.

A further object of the invention is to provide an improved drill bit which may be used with conventional rotary drilling rigs to effect a faster drilling operation.

Yet another object of the invention is to provide a torsional vibratory drill stem which may be used with conventional drill bits and rotary drilling rigs for effecting a faster penetration and rupturing of a formation by imposing torsional oscillations upon the rotating drill bit.

Still another important object of the invention is to provide an improved drill bit having a more compact roller tooth arrangement for covering more completely the entire bottom of the hole for penetrating and rupturing the formation.

Another extremely important object of the invention is to improve the drilling of offset bores by increasing the flexibility of the drill stem and by applying torsional oscillatory vibrations thereto.

An additional object, and in accordance with the preceding object is to provide a more accurate and a more easily manipulated directional control of a drill stem whipstock.

A still further important object is to provide a torsional oscillatory drilling assembly which may be readily supported and adjustably positioned in a well bore by a conventional rotary drilling stem and rotary drilling rig.

Still another important object of the invention is to provide an apparatus in accordance with the immediately preceding object and which may be employed and used during the customary rotary drilling operation.

Yet another important object is to provide an apparatus in accordance with the preceding objects and which will prevent to a considerable extent transmission of a torsional vibration of the drill bit to the rotary drill string.

A still further object is to provide an apparatus and method for generating torsional oscillatory vibrations at one portion of a drill string for producing torsional oscillatory vibrations of a tool at another portion of the same drill string.

An additional important object of the invention is to provide an apparatus and method in accordance with the immediately preceding object wherein the pressure of the drilling mud may be used to effect the generation of torsional oscillatory vibrations at one end of a drill string.

An additional object is to provide a support for a torsion stem in a well bore at easily adjusted positions therein and whereby any desired length of the stem may be used to impart torsional vibrations to a drill tool thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 1–12 disclose an embodiment incorporating therein the principles of this invention and wherein:

FIGURES 13–15 are elevation views of different types of drilling tools in which may be incorporated the principles of this invention, and in which:

FIGURE 13 is a elevation view of a drill head having a pair of drill bits of different diameter thereon and comprising a pilot bit and a secondary drill bit;

FIGURE 14 is a perspective view showing a pilot bit combined with a reamer assembly;

FIGURE 15 is a perspective view showing a pilot bit, a secondary drill bit and a reamer combined in a single tool;

Figure 16:
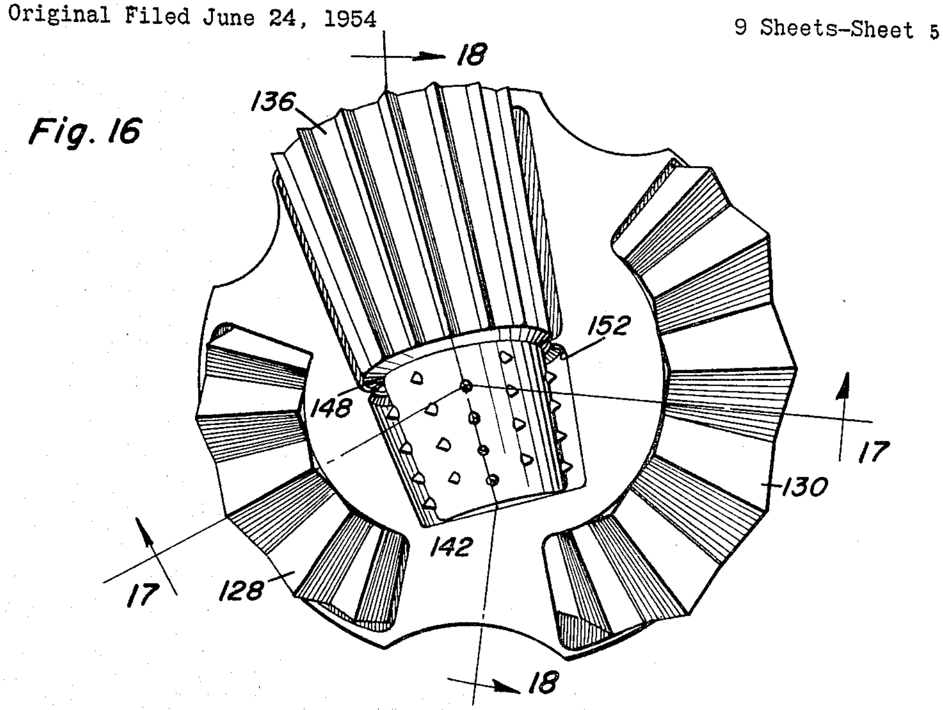
Figure 17:
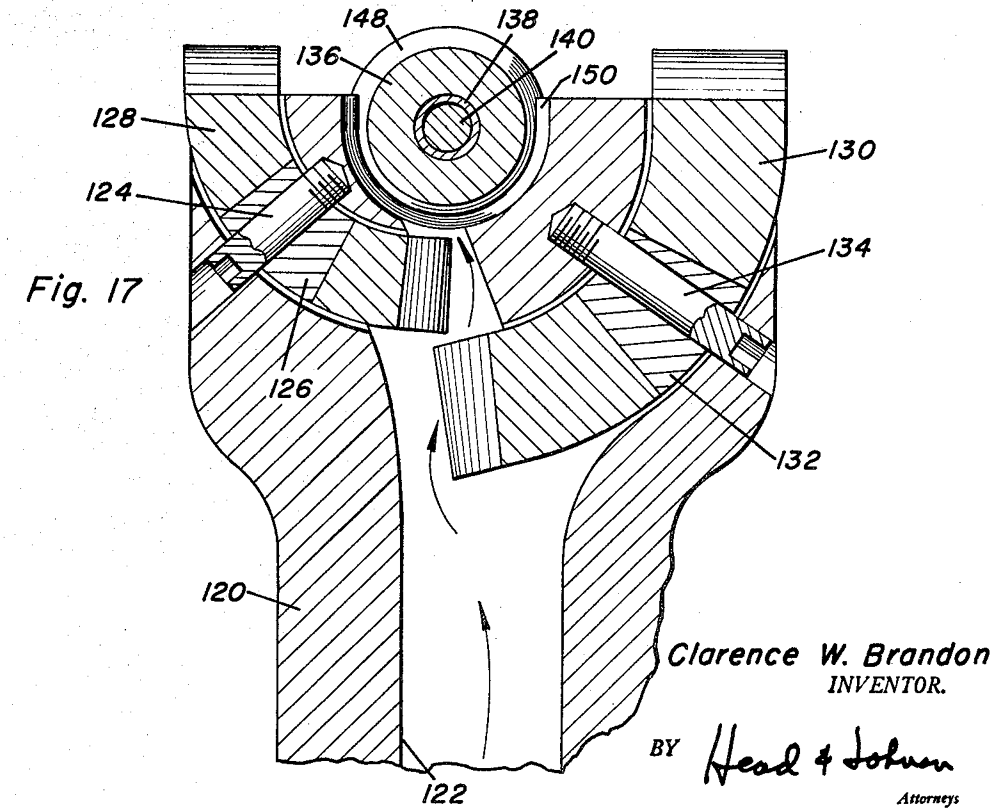
Figures 18, 19:
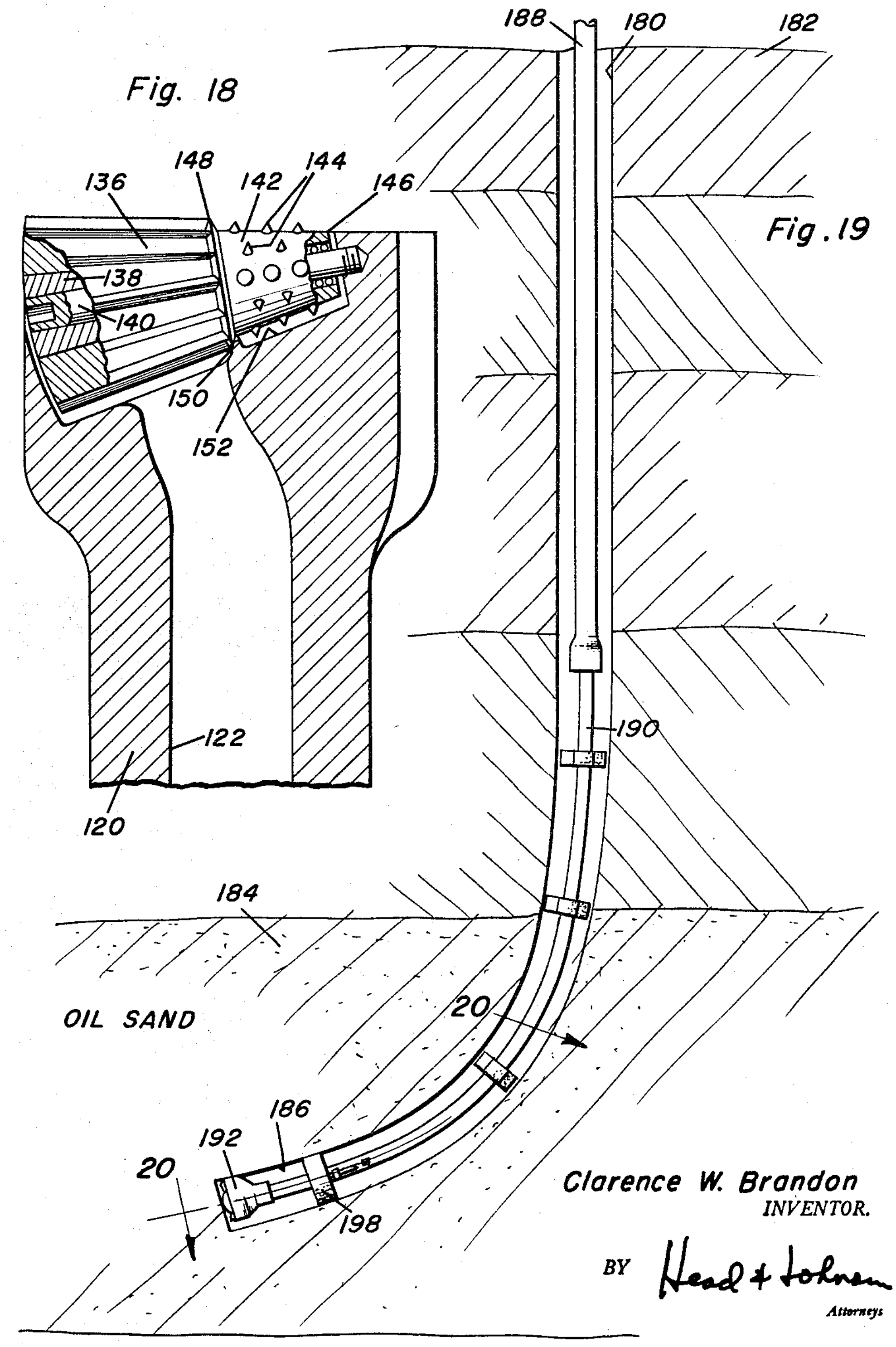
Figures 20, 21, 22:
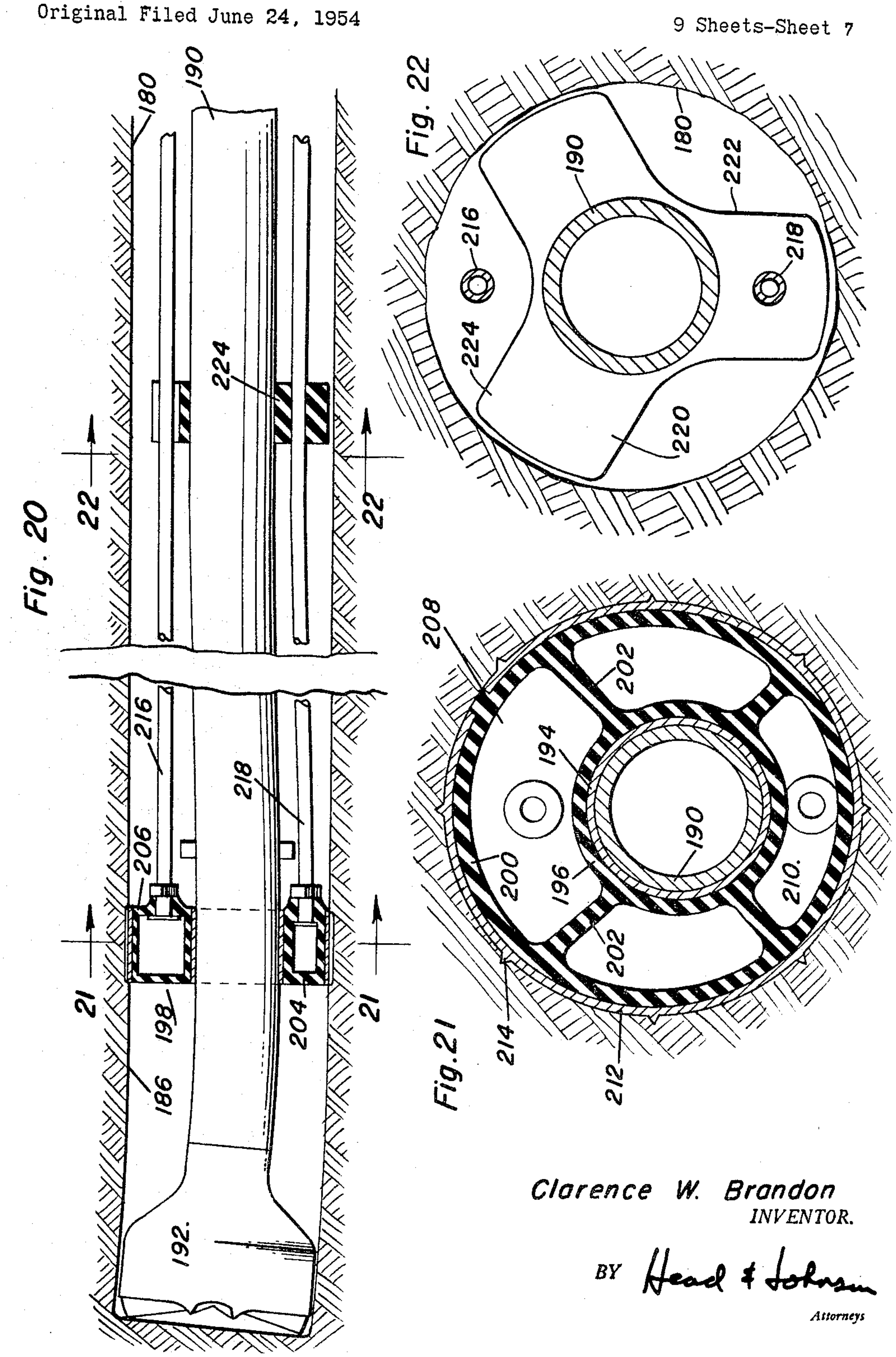
Figure 23:
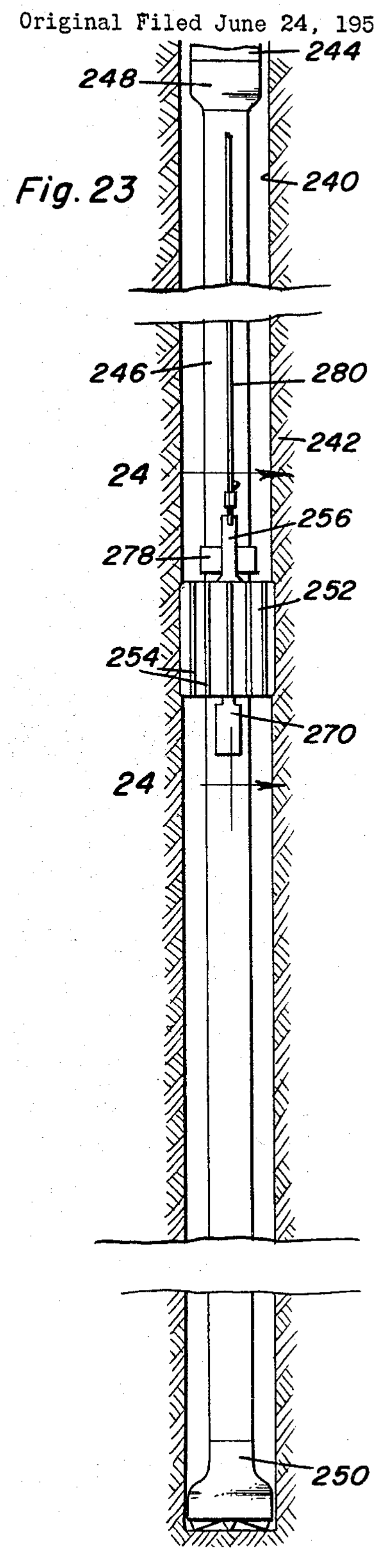
Figure 24:
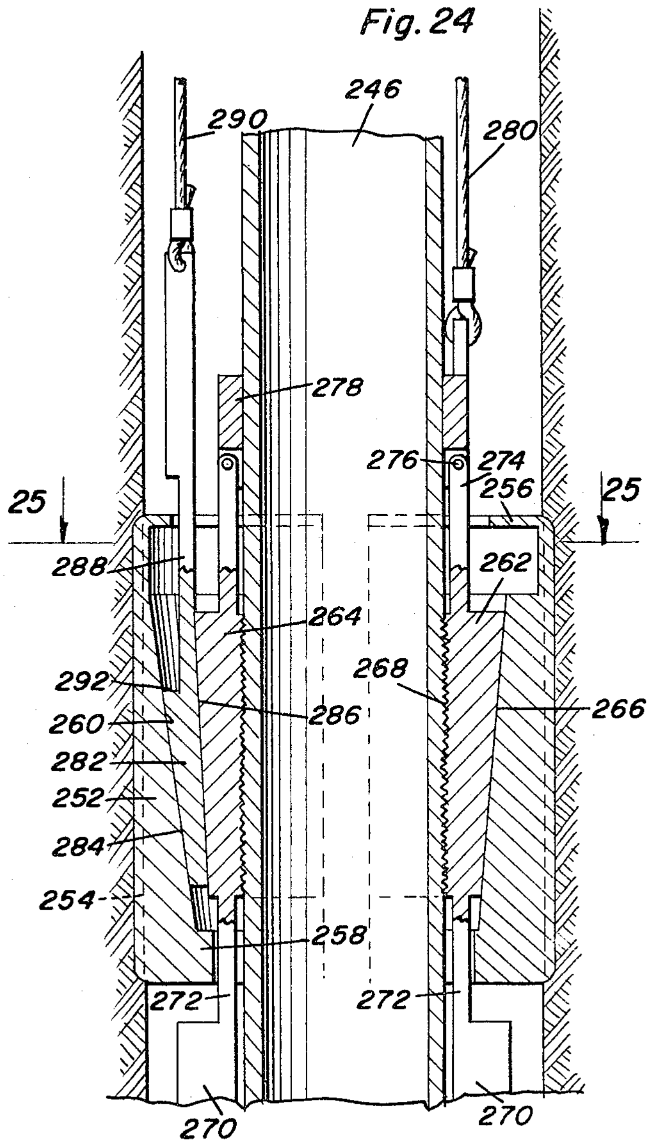
Figures 25, 26, 27, 28:
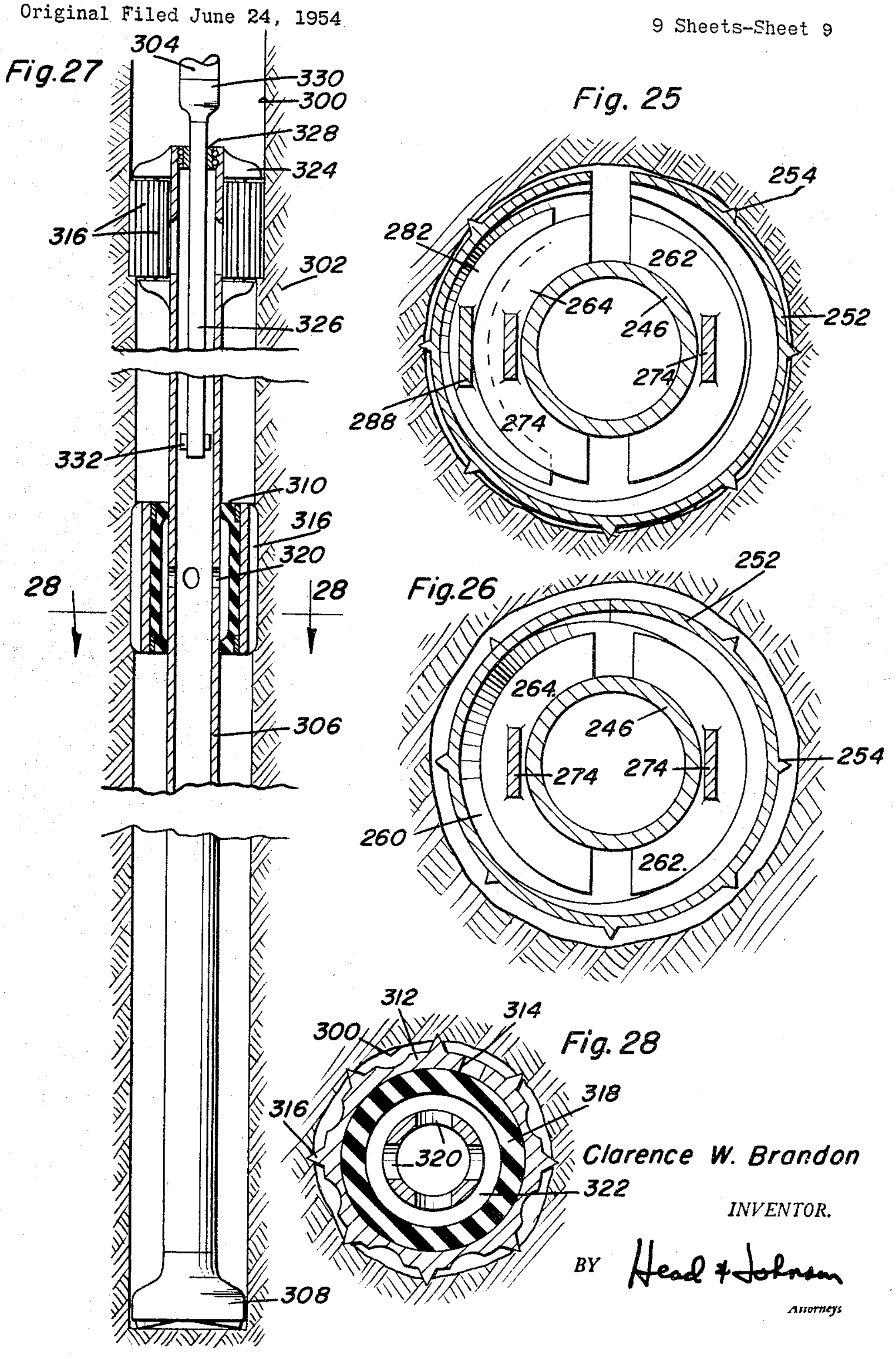

FIGURES 16–18 disclose a modified construction of a drill bit which is adapted to distribute the drilling action over substantially the entire area of the hole bottom and in which:

FIGURE 16 is an end elevational view of a modified construction of drill bit;

FIGURE 17 is a sectional view taken substantially upon the plane indicated by the broken section line 17—17 of FIGURE 16 and showing the novel construction and arrangement of two of the rotary roller cutters of the drill bit;

FIGURE 18 is a vertical sectional view through the head of the drilling bit, taken substantially upon the plane indicated by the broken section line 18—18 of FIGURE 16 and showing the mounting and construction of a diametrically disposed roller cutter of the drill bit;

FIGURES 19–22 illustrate the manner in which the novel torsional oscillatory vibratory drilling assembly of this invention may be utilized to effect directional offset drilling operation and in which:

FIGURE 19 is a vertical sectional view through a portion of a formation and illustrating the manner in which the novel torsional drilling stem constitutes a flexible whipstock for the drilling apparatus;

FIGURE 20 is a sectional view taken substantially upon the plane indicated by the section line 20—20 of FIGURE 19, parts being broken away, and showing the construction and arrangement of guide means and directional controlling means for adjustably and controllably deflecting and flexing the whipstock for offset drilling operations;

FIGURE 21 is a vertical transverse sectional view taken upon an enlarged scale substantially upon the plane indicated by the section line 21—21 of FIGURE 20 and showing in particular the construction of a directional guiding element of this arrangement;

FIGURE 22 is a vertical transverse sectional view taken substantially upon the plane indicated by the section line 22—22 in FIGURE 20 and upon an enlarged scale;

FIGURES 23–26 disclose a modified construction in accordance with this invention, and particularly relate to an arrangement for adjustably supporting a torsion stem whereby any selected predetermined length of the torsion stem may be utilized for imparting torsional oscillatory vibrations to a drill bit carried thereby and in which:

FIGURE 23 is a vertical sectional view through a portion of a formation, parts being broken away, and showing the embodiment of these figures operatively positioned therein for rendering effective a selected predetermined portion of a torsion stem for torsional oscillatory vibration;

FIGURE 24 is an enlarged detailed view taken in vertical section substantially upon the plane indicated by the section line 24—24 of FIGURE 23 and showing the internal construction of the adjustable supporting means for rendering operative selected lengths of the torsion stem;

FIGURE 25 is a horizontal sectional detail view taken substantially upon the plane indicated by the section line 25—25 of FIGURE 24 and in which the adjustable support is engaging the well bore;

FIGURE 26 is a horizontal sectional detail view taken substantially upon the plane indicated by the section line 25—25 of FIGURE 24 and with the adjustable support being disengaged from the well bore;

FIGURES 27 and 28 disclose a modified construction wherein a torsion stem is supported at a nodal point of torsional vibrations and whereby torsional oscillatory vibrations generated at one end of the stem are utilized to operate a drilling tool at another portion of the stem and in which:

FIGURE 27 is a vertical sectional view through a portion of a formation, parts being broken away, and showing the manner in which the principles of this modification are applied thereto; and, FIGURE 28 is a horizontal sectional detail view taken substantially upon the plane indicated by the section line 28—28 of FIGURE 27.

*General principles of the invention*

In the drilling of wells and especially of deep wells in the earth such as oil wells and the like, each of the two general types of drilling operations possesses certain advantages. Thus, the percussion method of drilling, customarily employed by cable tools and which consists in raising and dropping a drill bit to produce by the impact of the latter upon the formation a penetration of the formation and a rupturing of the same, is especially advantageous for penetrating formations of very hard and brittle rock, since at certain frequencies of the periodic impacts of the drill upon the formation, rupturing and fracturing thereof is greatly accelerated. However, and especially for drilling in the softer formations, the rotary method of drilling, involving the rotating of the tool at the end of a drilling stem and whereby the tool functions primarily to cut, break and/or scrape the formation while penetrating the same is generally considered to be the most satisfactory method of drilling.

Numerous attempts have been made to combine the advantages of these two methods of drilling and to impart periodic percussion to the drill as the same is rotated by a rotary drilling rig. In general, however, such efforts have been not completely successful or satisfactory owing to a number of reasons, the chief of which apparently resides in the very heavy vibrations and the shocks which are imparted to the entire drilling string during the rotary and percussive action of the drilling bit, to the resultant detriment of the drilling string and its operative mechanism.

The fundamental and basic concept of the present invention is to overcome the above objections and to combine with the advantages of rotary movement of the drilling bit, periodic percussive or impactive action of the same upon the formation and especially at high frequencies; and to increase the effectiveness of the rotational movement of the bit by combining therewith torsional oscillatory vibrations of a flexible torsion stem but without imparting any substantial portion of these vibrations to the drilling string.

It is generally known, as set forth in my prior copending applications, Serial Nos. 241,647 and 296,038, now Patent Numbers 2,796,129 and 2,866,509, respectively, that oil bearing formations may be generally fractured, ruptured or disintegrated, theerby facilitating the recovery of petroleum deposits therefrom, by applying thereto pulsating pressures of a high order of frequency through the agency of a fluid medium. The present invention utilizes this phenomena in combination with the combined vertical reciprocation and torsional oscillation of a drilling bit to increase the rate of penetration of the formation and the rupturing or fracturing of the same by the drilling bit.

Throughout the various modifications set forth in this application, use is made of the increased efficiency of a drill bit obtained by applying thereto torsional oscillations of a relatively thin and flexible torsion stem to thus produce a periodic and/or oscillatory action of the stem upon the drilling bit. Further, since the reversing torsional twisting of the torsion stem serves to intermittently shorten and restore the overall length of the same, advantage is taken of this phenomena to thereby periodically raise the bit above the formation upon the winding of the stem in each direction of oscillation; and to drop the bit with an impact and percussion upon the formation during the unwinding of the same.

Figure 5:
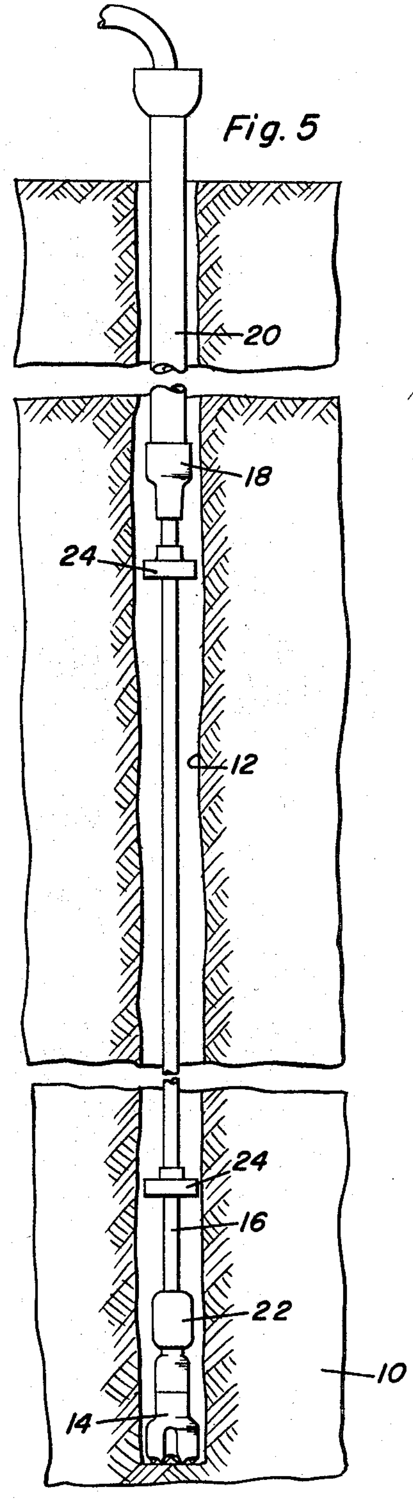
FIGURE 5 is a vertical sectional view through a well bore, portions being broken away and showing therein a drilling stem to which is attached a torsion stem and a drill bit in accordance with this invention.

FIGURE 5 illustrates a typical manner in which the principles of this invention may be applied to a well drilling operation. In this figure there is seen a portion of an oil bearing formation 10 in which extends a well bore 12. A drill bit 14 which may be of a variety of constructions as disclosed in detail hereinafter is positioned in the well bore for drilling the same. This bit may be of any conventional design, although the novel and improved drill bits in accordance with this invention and as disclosed and claimed hereinafter may be beneficially employed with advantageous results in the arrangement illustrated in FIGURE 5.

The drill bit 14 is mounted at the lower end of a torsional stem 16 which in turn is carried by a connecting coupling 18, which also diagramatically represents a gearing assembled as set forth later, at the lower end of a conventional rotary drilling string 20 of drill tubing of conventional design. The latter is operatively connected with the usual rotary table and operating mechanism at the surface of the ground, not shown, in the usual manner.

Diagrammatically indicated at 22 is a heating device whereby heat from any suitable source may be applied to the drilling fluid passing through the drilling bit; to the formation through the fluid surrounding the drilling bit; and which may either apply sensible heat to the fluid and formation or may produce or increase the energy content of an energy transmitting high frequency wave vibration in the medium and formation. The various forms of heating devices and their methods of operation have been disclosed and claimed specifically in my copending applications Serial Nos. 431,246, now U.S. Patent 3,133,591, S.N. 431,388, now abandoned, and S.N. 434,-299, now U.S. Patent 3,042,115, and in themselves form no part of the present invention. However, the advantages and functions of these constructions may be beneficially employed as an accessory to and as an adjunct of the apparatus and methods for drilling as set forth in this application.

Further shown in FIGURE 5 are a plurality of centralizing devices 24 which are secured to the torsion stem 16 at various desired locations, and preferably at nodal points of vibration thereon, to eliminate whipping action of the torsion stem and to center the stem in the well bore while permitting torsional oscillation of the stem as set forth hereinafter.

Although the present application discloses and illustrates the processes and apparatuses of this invention as applied and used in the drilling of wells, it will be evident that many of the principles of the same may be satisfactorily employed for other drilling operations as in the drilling of tunnels and the like.

*Embodiments of FIGURES 1–12*

Figure 10:
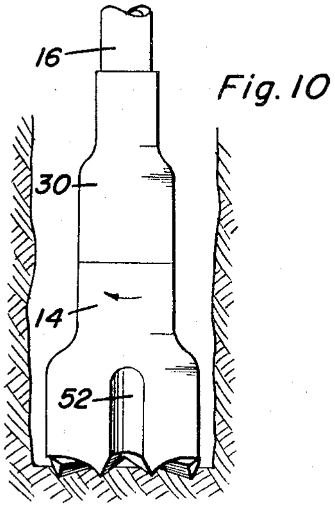
Figure 11:
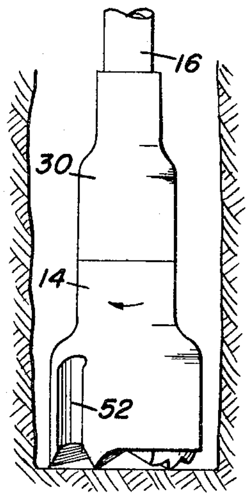
Figure 12:
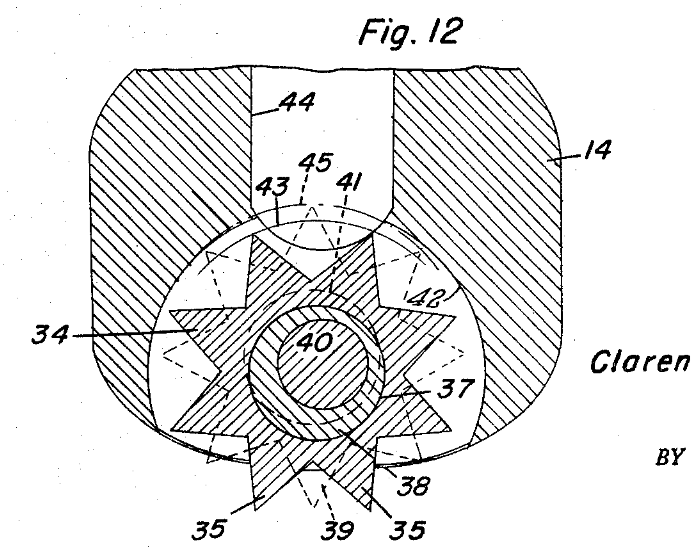
FIGURE 12 is a diagrammatic view, similar to FIGURE 4, and illustrating the manner in which the novel drill bit is employed to impart pulsations to the drilling mud and to the formation being penetrated by the drill bit.

In the embodiment of FIGURES 1–12, FIGURES 1–4 disclose an improved construction of drill bit for carrying out the principles of this invention, while FIGURES 6–11 disclose sequential operations of the drill bit and torsion stem in the use of the device and FIGURE 12 discloses diagramatically the novel principles of operation of the improved bit for producing pressure pulsations in the drilling fluid and in the formation.

As shown in FIGURES 1–4 the drilling it 14 has a head or body portion 26 and an externally threaded tapering neck 28 by means of which the bit is detachably secured in the conventional manner to a connector 30 carried by the end of a conventional string of drill tubing or by the torsion stem or rod 16 of the present invention. The torsion stem is tubular and of any desired conformation and of a greatly reduced diameter compared with that of the drill string tubing 20 with which it is connected and with which it communicates, in order that the torsion stem shall have an exceedingly high degree of torsional flexibility, and in some instances, as for offset directional drilling, of high lateral flexibility, preferably greatly in excess of that of the drill string tubing.

It is contemplated that the torsion stem may be used in various lengths as desired, and may extend in length up to 100 feet or more. The length of the torsion stem employed will depend upon a number of variable factors attending its use, as for example, the type of formation encountered and in particular the amplitude of the torsional vibration which it is desired to impart to the drill bit and the vertical motion which is desired for the same in the periodic percussions applied to the bit.

Referring again to FIGURES 1–4 it will be seen that the head of the drill bit has journaled therein a pair of conical toothed rollercutters 32 and 34, each of which is provided with a bearing socket 36 receiving an eccentric bearing sleeve or bushing 38 which is journaled upon an inwardly directed axle or trunnion 40 carried by the head 26 and extending into the roller receiving cavity 42 into the upper end of which extends the drilling fluid duct or passage 44 which is in communication with the interior of the torsion stem 16 and/or the drill string tubing 20 as previously mentioned.

At this point, it should be noted that the rotary cutters 32 and 34 are freely rotatable upon their eccentric bushings 38 and the latter in turn are also freely rotatable upon the trunnions 40. As so far described, it will now be understood that the drilling fluid which is pumped down the drill tubing 20, passes through the torsion stem 16 and the passage 44 and is discharged against the teeth of the roller cutters 32 and 34, passing circumferentially about the same and thus causing rotation of the cutters about their eccentric bearings 38. This rotation, with the drill bit resting upon the bottom of the formation and with all or any desired portion of the weight of the entire drill string tubing thereon, causes the cutters and consequently the drill head to rotate about the vertical axis of the drill string within the bore, thereby imparting a torsional twisting force to the torsion stem 16 and twisting the same in one direction. This rotation continues until the increasing torsional force in the torsion stem resists further twisting; and/or until shortening of the torsion stem because of this twisting has lifted the cutters from engagement with the formation at the bottom of the well bore.

When the torsion stem is thus shortened sufficiently, so that the roller cutter teeth are out of contact or out of secure contact with the formation, the torsion stem will unwind rapidly, with an accelerating rotation, thereby elongating the same and causing contact of the teeth with the bottom of the well bore. This lengthening or return of the torsion stem to its normal length will cause the drill to again engage the bottom of the formation in the well bore with a percussive impact which is proportional to the actual torque applied to the torsion stem; or the same augmented by that portion of the weight of the drill string tubing which is allowed to rest upon the drill bit. Further, the reverse oscillation or rotation of the drill bit in this unwinding of the torsion stem will obtain a high speed of rotation of the drill bit and cause the same to engage the formation with a high speed rotary impact causing the cutting elements of the drill head to further drill, abrade, fracture or rupture the formation for penetration of the same.

Figure 1:
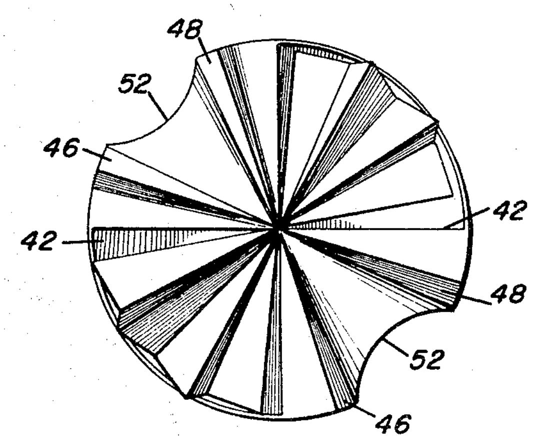
FIGURE 1 is a plan view of the cutter end of a novel drilling bit in accordance with this invention.
Figure 2:
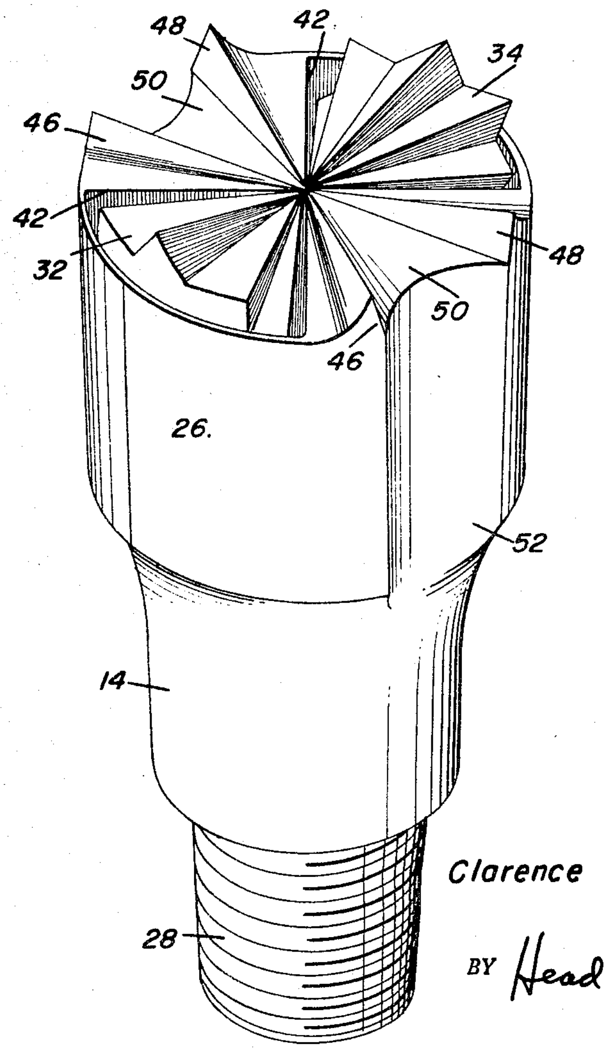
FIGURE 2 is a perspective view of the drilling bit of FIGURE 1.

It will further be observed by reference to FIGURES 1 and 2 that the head of the drill bit between the two oppositely disposed rotary cutters 32 and 34 is provided with a pair of stationary cutting edges 46 and 48, at each side of the cutterhead. These edges extend radially to the center of the drill bit head and constitute an unyielding cutting edge which will penetrate and fracture the formation upon the percussive blow of the drill bit as above mentioned; and which will also have a scraping action upon the formation during the torsional twisting of the drill bit. Disposed betwen the stationary cutters 46 and 48 are drainage channels 50 which extend across the cutting face of the bit and communicate with vertical channels or troughs 52 by which the drill fluid after passing through the roller cutters travels up past the bit and up the well bore to remove cuttings from the drill bit.

*Operation of the embodiment of FIGURES 1–12*

In one process of operating the apparatus, the torsion stem may be fixedly secured to the drill string tubing 20 and may be rotated therewith during the customary drilling operations of a rotary drilling rig; or may be held against rotation by the drill string. In the first instance, the torsional oscillations will be produced in the torsion stem during its rotation by the drill string tubing, whereby the drilling effects of the torsional operation will be added to the customary rotary drilling action. In the second case, the drill string tubing will merely serve as a stationary support to hold the torsion stem against rotation and to adjustably position the stem at selected positions; and for applying various portions of the drill string tubing weight thereto, while the torsion stem and drill perform their drilling operations solely through the vibratory effects of the torsional oscillations.

It is also possible and is an important feature of this invention to provide a suitable gearing assembly operatively interposed in any desired manner between the drill string tubing 20 and the torsion stem 16, as diagrammatically indicated by the connecting casing 18 of FIGURE 5, whereby rotation of the tubing 20 can be caused to result in rotation of the torsion stem at various selected speeds in either direction; or to cause rotary oscillation of the torsion stem from the continuously rotating tubing 20. Thus, the power of the conventional rotary mechanism as applied through the drill string tubing can be utilized to produce and/or assist in the torsional oscillation of the torsion stem. Inasmuch as the principles of this invention are not limited to any particular construction of gearing assembly, and since gearing assemblies for performing these changes in rotative motion are well known, a detailed description and illustration of the same is deemed to be unnecessary and has been omitted in the interest of simpilfication of the description and drawings and in order to set forth more clearly an explanation of the novel features of this invention.

Attention is now directed more specifically to the diagrammatic views of FIGURES 6–11 for an explanation in detail of the action of the torsional stem and drill bit during torsional oscillatory vibration of the same.

Figure 6:
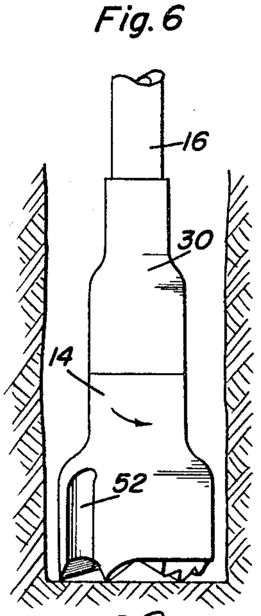
FIGURES 6–11 are sequential views, partly diagrammatic and taken in vertical section through a well bore in a formation and illustrating the sequential operation of the novel drill bit and torsion stem.
Figure 7:
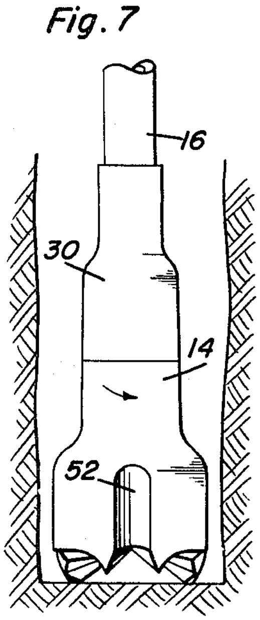

In FIGURE 6 is disclosed the position of the stem and bit as the bit rests upon the bottom of the formation before the start of the drilling operation; or at what may be termed its normal position or intermediate position in the cycle of oscillatory vibration. In this position, it is assumed that drilling fluid is now being delivered under pressure through the passages in the drill string tubing and torsion stem and to the roller cutters of the bit. As this fluid passes about the teeth of the cutters, the latter function as the teeth of gear pumps, and the passage of the fluid between the cutters and the adjacent wall of the cuter cavities causes rotation of the cutters upon their eccentric bushings. Since there is considerable weight applied to the cutters from the superimposed torsion stem or the combined torsion stem and drill string tubing, the teeth of the cutters bite into the formation as they are rotated, thereby producing a rotation of the roller cutters about the vertical axis of the drill and therefore of the bit and torsion stem as indicated by the arrow in FIGURES 7 and 8.

Figure 8:
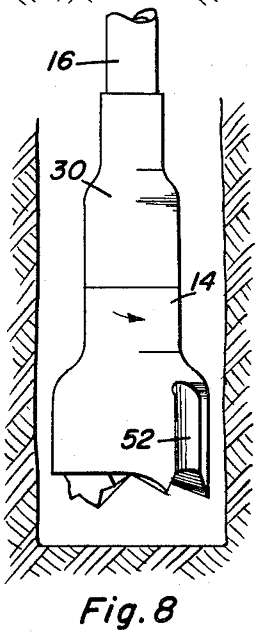

As the torsion stem is rotated, the twisting of the same results in a shortening of its length, so that eventually the shortening of the stem raises the bit from the bottom of the formation, as shown in an exaggerated manner in FIGURE 8.

Throughout the diagrammatic FIGURES 6–11, the direction and extent of the rotation of the torsion stem and bit may be seen from the arrows and from the relative positions of the drilling fluid return passage or channel 52.

Figure 9:
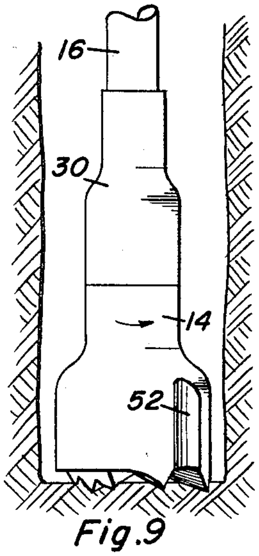

As the bit is raised from the bottom of the formation as shown in FIGURE 8, the oscillation in that direction ceases, and the torsional force within the stem causes a reverse oscillation as shown by the arrow in FIGURE 9, whereby the stem unwinds at increasing and accelerating speed. During this unwinding, the stem of course lengthens and returns to its original normal length, whereby the bit will engage the bottom of the formation as shown in FIGURE 9. This engagement will obviously be with a considerable percussive impact, this impact depending upon the weight applied to the cutter bit by the superposed torsion stem and tubing. In addition, there will be a rotative or scraping action of the rotary cutters and of the stationary cutter blades upon the bottom of the formation. It is contemplated that the impact of the rotating roller cutters and the percussive impact of the stationary cutter blades 46 and 48 will produce a heavy direct percussive impact upon the bottom of the formation; while the rotating action and scraping effect of the roller cutters or the stationary drill bit teeth will further assist in cutting, fracturing and disrupting the formation.

At the position of FIGURE 9, the bit has struck the bottom of the well bore with an impact, but still possesses very considerable rotational inertia. This momentum will therefore cause continued rotation, as shown in FIGURE 10, whereby the torsion stem and bit will be oscillated beyond its normal position until as shown in FIGURE 11 the torsional winding of the stem in the reverse direction will lift the cutters from the bottom of the formation and as in the manner of a pendulum, will store up a force which will again reverse the movement of the torsion stem. At the position of FIGURE 11, the torsion stem will again oscillate in the direction shown by the arrow in FIGURE 7 and during this stroke or return movement will again resume the position of FIGURES 6 and 7 but with a rapid rotational movement.

Figures 3, 4:
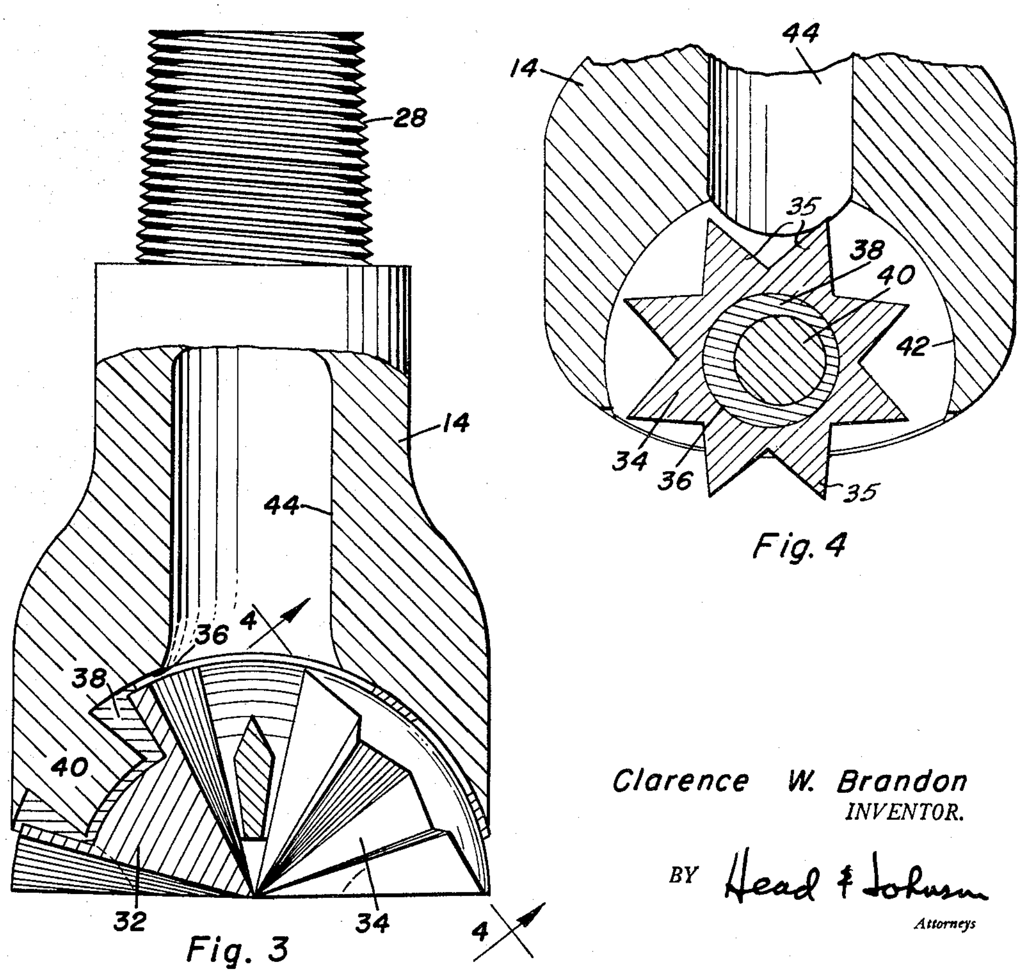
FIGURE 3 is an elevational view of the drill bit of FIGURE 2, parts being shown in central vertical section.
FIGURE 4 is a sectional view showing the eccentric mounting of a roller cutter and is taken substantially upon the plane indicated by the section line 4—4 of FIGURE 3.

As will be seen from FIGURE 4, the eccentric bearing 38 will throw the roller cutter towards one side of the cavity 42. The arrangement of the eccentric is such that the weight of the drill stem and torsion stem upon the roller cutter will shift the eccentric to one side, of its vertical axis, while the release of this weight and the pressure of the drilling fluid will shift the eccentric to the other side. Thus, the cutter is caused to move laterally within its recess to thus vary the areas of the fluid passages upon the opposite sides of the cutter teeth. By this means the fluid is directed to either one side or the other of the cutter teeth, thereby controlling the direction of rotation of the same.

It is intended that this feature be utilized so that the drilling fluid pressure will be so directed as to cause the teeth to assist in imparting oscillatory movement to the stem in the direction in which the stem is tending to oscillate. Thus, in FIGURES 6 and 7, the roller cutter is shifted so as to direct the fluid to that side of the cutter teeth which will cause the drill bit and stem to rotate in a clockwise direction as viewed from the bottom of the bit; while in FIGURES 8–11 the cutter bit will be shifted by the pressure of the fluid and will tend to produce an opposite rotative effect upon the torsion stem.

By this means the maximum propulsive effect is given to the torsional oscillations of this torsion stem causing the same to vibrate torsionally periodically or in a resonating manner. There will thus be a rhythmic torsional oscillation set up in the torsion stem; or at least in that portion of the same which is rendered operative in the manner and by the means to be subsequently set forth herein.

It is believed to be evident that the fluid pressures of the drilling fluid applied to the roller cutters will function in the same manner as fluid pressure turbines; and will produce the rhythmic torsional vibration as described.

Obviously, the extent of the oscillation, and the frequency of the same may be controlled or adjusted in various manners, as by controlling the force of the oscillatory impulses applied to or delivered by the roller cutters; by adjusting the length of the torsion stem; or by otherwise altering its characteristics. In addition, the same may be assisted or supplemented by oscillatory motion imparted to the torsion stem by the drilling string tubing through the gearing assembly 18 as previously mentioned.

In addition to the oscillating pulsations applied to the torsion stem by the rotary cutters, a further very important method is performed by the same. As shown in FIGURES 4 and 12 the cutter 34 is provided with teeth as shown at 35. When the cutter is in such position that two adjacent teeth rest upon the bottom of the formation, the center of the cutter will be at its lowest position as shown by the full line circle 37, in FIGURE 12. However, when the cutter is so rotated that only one of the teeth as at 39 rests upon the bottom of the formation, the cutter will be in a raised position as shown by the dotted lines circle 41.

Therefore during rotation of the cutter, a pulsating upward and downward movement is applied to the center of rotation of the roller cutters, as will be seen by comparing the circles 37 and 41; thereby producing a vertical up and down movement of the eccentric. This will cause the upper surface of the cutter to move towards and from the discharge end of the passage 44 in the cutter bit, as will be seen by comparing the full line and the dotted line arcs 43 and 45 which represent the path of travel of the tips of the cutter teeth.

Obviously, when the roller cutters are in the uppermost position as shown by the dotted line arc 45, the flow of the drilling fluid from the passage 44 is considerably throttled or retarded as compared with this flow when the cutter is in its lower position as indicated by the full line 43. Thus, the pulsating of the up and downward movement of the cutters serve to impart a pulsating throttling action to the flow of fluid, these pulsations in turn producing pulsating pressure in the drilling fluid and from the latter to the bottom and sides of the formation in the well bore thereby penetrating the interstices of the formation.

The roller cutters in their above described operation also operate to produce a water hammer effect. This operation is performed as follows.

The drilling fluid is continuously supplied to the roller cutters and to the spaces between the same and the stationary cutters 46 and 48. There is therefore normally a flow past the roller cutter teeth and beneath the same as they rotate in the formation, this flow passing up the channels 52 in the drill head and up the well bore.

However, when the torsion stem unwinds from either position of maximum torsional displacement, and strikes a percussive blow upon the formation in the bottom of the well bore, the roller cutters will be driven up into the drill head by the rotation of their eccentric bearings, and the stationary blades 46, 48 will be driven into the formation. The penetration of the latter into the formation will momentarily block the flow of fluid and prevent its discharge from beneath the roller cutter teeth and into the discharge chamber 52. At the same time the upward movement of the roller cutter teeth will obstruct flow of fluid from the drill head passage into the cavities of the roller cutters. The sudden cessation of flow from the above causes will set up violent hammer shock waves in the fluid which will be transmitted into the formation, greatly assisting in disrupting the same.

It should be noted that the hammer shock action is perodic with respect to the torsional oscillations and occurs at the moment of maximum rotational velocity of the drill stem and cutters.

Figure 15:
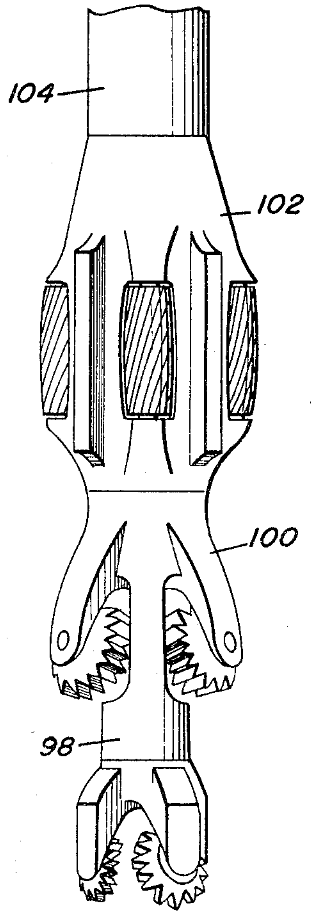
Figure 14:
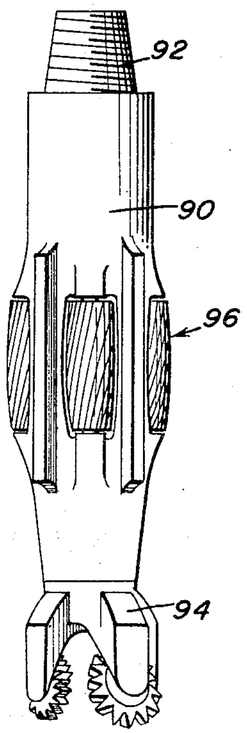
Figure 13:
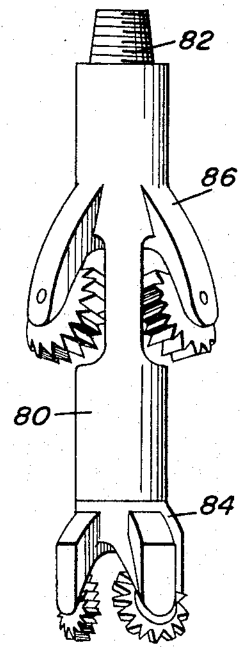

*Embodiments of FIGURES 13–15*

A drill 14, mounted upon the end of torsion stem 16, may be of a variety of constructions. In addition to the arrangement shown in FIGURES 1–4, the drill may consist of a number of different more or less conventional elements or tools assembled in various relations.

As shown in FIGURE 13, the drill 80 having the threaded connecting stem 82 may include at its lower end a pilot drill bit 84 similar to construction previously described, but of a smaller diameter than the over-all diameter of the hole which it is desired to drill. Mounted upon the drill bit 80 above the pilot drill 84 is a secondary drill bit 86 which includes bits similar to those of the drill 84 or if desired conventional cutter bits but having a greater over-all diameter than the pilot drill 84 whereby to enlarge the bore drilled by the pilot drill 84. The secondary drill 86 may of course be supplied with driving fluid and contain the eccentric bearings and either or both of the pilot and secondary drill bits may perform exactly the same functions as the pilot drill 84, and as those set forth in connection with the embodiments of FIGURES 1–4.

In the arrangement of FIGURE 14, the drill body 90 having the threaded connecting neck 92 is provided with a pilot drill 94 which is similar to the drill 84 and may be of the same construction and operation. Upon the drill body above the pilot drill there is provided a reamer assembly 96 which may be of either conventional design or which also may be supplied with the drilling fluid under pressure to impart rotation to these reamers. The single tool in this embodiment thus serves to drill a pilot bore and then to ream out this bore to the desired size of well bore.

In the further modification of FIGURE 15, the compound drill head includes the pilot drill assembly 98 and the secondary assembly 100, which may be identical with the arrangement of FIGURE 13, and which is detachably secured to the lower end of a reamer assembly 102 which may be of the same construction as the reamer assembly 96 of FIGURE 14 and which in turn is carried by the lower end of a torsion stem 104. In this form, a pilot hole may be drilled by the pilot drill assembly 98; the hole may be further enlarged by the secondary drilling assembly 100, and may then be reamed to final size by the reamer assembly 102. Each of the cutting elements of this compound drill assembly may be driven by the pressure of the drilling mud in the same manner as set forth in connection with FIGURES 1–4.

It is obvious that numerous well drilling tools may be combined into a single assembly with a drill bit and may incorporate therein the features of the drill bit as set forth in connection with FIGURES 1–4.

*Embodiment of FIGURES 16–18*

In the embodiment of FIGURES 16–18 there is disclosed a modified form of drill bit in accordance with the invention and in which the cutting action of the drill is distributed more completely over the entire cross-sectional area of the bottom of the well bore, and especially across the central portion of the same, which central portion is customarily but poorly contacted and operated upon by conventional roller drill bits. In this form, the drill 120 is provided with a customary central axial passage 122 for the passage of drilling fluid therethrough, and the face of the drill bit is provided with appropriate cavities or recesses for journaling a plurality of rotary cutters.

Thus, journaled upon an axle 124 by means of the eccentric bushing 126 is a toothed roller cutter 128. Facing this cutter is a second and larger cutter 130, journaled upon an eccentric bushing 132 which in turn is freely rotatable upon the axle 134. It will be observed that the radii of the two cutters are such that the larger cutter 130 lies radially outside of the cutter 128 from a common center to thus provide a compact nested engagement of these cutters upon the interior of the drill bit head.

Disposed diametrically across the cutting face of the bit and extending into the central space between the cutters 128 and 130 is a third conical roller cutter 136 which at its larger and outer end is journaled upon the eccentric bearing 138 which in turn is freely rotatable upon the axle 140. Upon its inner end, which extends through and lies beyond the axial center of the drill bit head, the roller cutter 136 is provided with a diametrically reduced conical portion 142 having suitable teeth or spikes 144 thereon for penetrating and fracturing the formation. As shown in FIGURE 18, the axle 140 extends throughout the length of the cutter 136 and is engaged in a portion of the drill head, a bearing assembly 146 being interposed between the reduced end 142 of a cutter and the axle.

Where the cutter 136 joins the reduced portion 142, there is provided a shoulder 148 and an arcuate rib or lip 150 is raised from the surface of the recess 152 which receives the reduced portion 142, and establishes a sealing engagement with the shoulder. This arrangement prevents that portion of the drilling fluid which passes down the bore 122 and passes across the cutter 136 from directly passing into the cavity 152; thus increasing the effectiveness of the drilling fluid in causing rotation of the roller cutter. It will be observed that in this compact arrangement of the three cutters, the cutter 136 with its reduced portion 142 serves to positively penetrate and disrupt the central portion of the bottom of the well bore, which central portion is not engaged by conventional roller bits, thereby distributing the cutting action of the rotary cutters across substantially the entire area of the bottom of the well bore.

As indicated by the arrows in FIGURE 17, a portion of the drilling fluid passing into the drill bit first passes across the teeth of the larger cutter 130, imparting rotation to the same; then is thrown by these teeth against the teeth of the smaller cutter 128 lying adjacent thereto for rotating the latter cutter; and finally passes about the diametrically disposed cutter 136 for rotating the latter. The remainder of the fluid from the passage 122 passes about the peripheries of the cutters 128 and 130. The fluid thus applies a turning movement to each of these cutters thereby increasing the forces exerted by the cutters and which tends to cause rotation of the drill about its vertical longitudinal axis; thereby applying torsion to the torsion stem to which the drill 120 is connected, in the same manner as set forth in detail in connection with the preceding embodiments.

As in the preceding embodiments, the action of the eccentrics causes a floating movement of the rotary cutters with the functions described in detail in connection with the preceding embodiments. Sufficient clearance is provided between the end faces of the cutters and their corresponding curved faces of the drill head 120 to permit the cutters to rotate relative to their bushings.

It will be readily observed that the embodiment just described may be employed with conventional drill strings without the use of the torsion stem; and that beneficial results can also be obtained from the relative arrangement of the three cutters even though the various eccentric bushings and their functions are omitted.

Still further, it is to be recognized that the particular drill bit construction just disclosed may be utilized with the gearing assembly 18 and/or the heating means 22 of FIGURE 5.

*Embodiment of FIGURES 19–22*

By virtue of the lateral flexibility of the torsion stem as well as its torsional flexibility, the assembly of the torsion stem and either a conventional or one of the improved drill bits in accordance with this invention is especially effective for offset drilling, since the torsion stem constitutes an admirable whipstock for the drill. In FIGURE 19 is disclosed such an arrangement in use, wherein the well bore 180 is shown extended through the formation 182 into an oil bearing formation 184 in which it is desired to provide an offset well bore 186 in a predetermined direction. In this embodiment, the conventional drill string tubing 188 is operated in a conventional manner and has connected at its lower end a torsion stem 190 of the character previously described and to which is secured a drill bit 192 of any desired character and which especially may be of the types and novel constructions set forth hereinbefore.

When it is desired to offset the well bore or cause the same to deviate from a straight axis, the torsion stem constituting the whipstock is deflected or bent laterally by an offset drilling directing means to be now described.

Secured to the torsion stem at any convenient location thereon, and preferably adjacent but at a convenient distance from the drill bit 192 is an annular collar 194, see FIGURE 21, which is either fixedly secured to the torsion stem or slidable thereon as desired. Securely attached to this collar is the annular inner wall 196 of an expansible and distendable guide member indicated generally by the numeral 198.

The guide member is of any suitable resilient, flexible and expansible material such as rubber or the like, and disposed about the annular wall 196 is provided with a further outer annular wall 200, connected to the inner wall as by radially extending sets of ribs 202. These ribs serve to flexibly and expansibly connect the inner and outer walls, and to partition the annular space therebetween into various chambers. The body 198 is closed at its opposite ends with a pair of end walls 204 and 206. Between the two walls and certain of the ribs 202 there are provided a pair of inflatable chambers 208 and 210. Any desired number of these chambers may be provided, the illustration of two such chambers being deemed to be satisfactory as an exemplification of the principles of this invention.

Surrounding the outer wall is a split metallic ring or shield 212 provided with suitable projections or teeth 214 upon its external surface and which teeth are adapted to engage and anchor the device to the wall of the well bore.

Fluid under pressure, such as drilling fluid, compressed gas or the like is selectively supplied to the chambers 208, 210 by means of conduits or pipes 216 and 218 respectively. These pipes extend through the well bore and are connected to the chambers of the expansible device and are controlled in any desired manner from the surface of the ground. The arrangement is such that as pressure is selectively applied to chambers 208, 210 the collar 194 and thereby the torsion stem 190 will be moved to one side or the other of the center of the well bore at that location thus producing a controlled lateral flexing of a portion of the torsion stem which will thus change the angle at which the drill head is disposed relative to the longitudinal axis of the well bore. Owing to the relatively high degree of lateral flexibility of the torsion stem as compared to a conventional drill stem, this arrangement permits easy flexing of the torsion stem and thus positioning of the drilling bit for the desired offset drilling.

As shown in FIGURE 22, the plurality of centralizers 24 previously described are employed for centering the torsion stem in the well bore. These centralizers include a plurality of radially extending arms 220 with channels 222 therebetween to permit passage of the drilling fluid. Two or more of these arms are provided with apertures 224 to permit passage of the pressure supplying conduits 216 and 218.

Due to its torsional and lateral flexibility the torsion stem may continue with its torsional oscillation during the drilling operation, during the offset drilling.

*Embodiment of FIGURES 23–26*

It is also an important feature of the invention disclosed in this application, to provide supporting means for the torsion stem which will permit and enable any selected length of the same to be operatively disposed for torsional oscillations; which will enable this length which is rendered operative for torsional oscillations to be readily changed; which will anchor and support the torsion stem at its upper extremity of torsional oscillation directly upon the wall of a well bore to thereby minimize any transmission of torsional vibrations to the drill stem tubing or other supporting means of the torsion stem; and which will facilitate vertical adjustment and positioning of the torsion stem in a well bore.

Shown at 240 is a well bore in a formation 242 in which a drilling operation is being conducted. The lower end of a drill string tubing 244, or any other means for supporting, raising or lowering the drill is shown attached to the upper end of the torsion stem 246 which is of the character previously described. The coupling member 248 which connects the torsion stem to the tubing 244, may also constitute a gearing assembly such as a gearing assembly 18 previously referred to in connection with the embodiment of FIGURES 1–12.

At its lower portion, the torsion stem is provided with a drill bit indicated generally by the numeral 250 and which may be of any conventional and known design, but preferably is of one of the various types of improved drill bits and set forth and claimed herein.

In addition, there also may be provided upon any suitable portion of the torsion stem as adjacent the bit 250, a heating device such as that indicated at 22 in the embodiment of FIGURES 1–12 and described in connection therewith.

An anchor support 252 is provided, the same consisting of a split sleeve or cylindrical body which is provided with a plurality of axially extending splines 254 upon its exterior surface, which splines are adapted to be pressed into the wall of the well bore, as shown in FIGURES 24 and 25, to prevent rotation of the anchor support but in some instances to permit vertical sliding movement of the same when a sufficiently heavy force is applied downwardly to the anchor support.

The anchor support has an inturned lip or flange 256 at its upper end together with a similarly inturned lip 258 at its lower end. Between these lips there is provided a conical downwardly converging tapered surface 260. Slidably received within the anchor support 252 is a pair of arcuate segments 262 and 264 which have a conical exterior surface 266 and a toothed cylindrical inner surface 268. Suitable weight members 270 depend from these segments, being supported by arms 272 which are integral with or else are fixedly secured to the lower portion of the gripping segments 262 and 264 and which are slidably disposed between the exterior surface of the torsion stem 246 and the lower inturned lip 258 of the anchor body 252. Extending upwardly from the gripping segments are supporting arms or links 274 which are pivoted as at 276 to a ring or collar 278 which is slidable upon the torsion stem 246, being supported and vertically reciprocated as by a cable or cables 280.

There is further provided a locking member 282 in the form of a conical sleeve having a conical outer surface 284 which is complementary to and cooperates with the internal conical surface 260 of the anchor support 252; and further has a conical internal surface 286 which is complementary to and cooperates with the external conical surface 266 of the gripping segments 262 and 264. As will be apparent from FIGURE 24, the surfaces 286 and 260 are relatively inclined whereby a wedging and locking action is produced upon downward movement of the locking member 282. Vertical movement is given to the member 282 through an arm or link 288 which extends through the opening between the inturned lip 256 and the torsion stem, and which is secured to an operating cable or cables 290. It should especially be observed that there is a shoulder 292 upon the upper end of the member 282 which shoulder is adapted to engage the inturned lip 256 upon upward movement of the locking wedge.

This form of the invention operates as follows:

The torsion stem 246 is lowered to the proper position desired in a well bore, and the assembly of the anchor support 252 in its collapsed position, as shown in FIGURE 26, together with the gripping segments 262 and 264, and the locking wedge 282 are then lowered into the desired position upon the torsion stem at which the predetermined length of the same is extended below the anchor support assembly. During this lowering operation of the anchor support assembly, it will be seen that the anchor support 252 is supported by the lip 256 thereof resting upon the top shouldered surfaces of the gripping segments 262, 264 and/or the shoulder 292 of the locking wedge, the weight of these members being supported by the cables 280 and 290. At this time, the cable 280 is lowered permitting the segments 262 and 264 to descend under the weight of their depending weights 270 whereby the teeth 268 of the sgements will engage the surface of the torsion stem at the desired location at which it is desired to suspend the same. The cable 290 is now slackened, permitting the wedge 282 to move or be forced in any desired manner into wedging position, thereby expanding the outer, ribbed surface of the support anchor 252 into the well bore for seating the same and urging the gripping segments 262 and 264 into gripping engagement with the torsion stem. In this position the device is securely anchored in place, the weight of the torsion stem is supported by the same and further contributes towards wedging the parts into a more secure anchoring position; and a desired length of the torsion stem, extending below the supporting device, is now free to oscillate torsionally in the same manner as set forth in detail with regard to the torsion stems of the preceding embodiments.

When it is desired to re-position the anchor support in the well bore, as in order to permit the drilling operation to continue downwardly, or when it is desired to vary the operative length of the torsion stem between its support and the bits, adjustment may be readily effected by first withdrawing the wedging member 282 by the cable 290 thus releasing the wedging and locking action and permitting the split support anchor body 252 to contract radially. This arrangement is shown in FIGURE 26 wherein it will be seen that this expansion has closed the slot in the circumference of the anchor support body, and has withdrawn the outer circumference and the ribs from contact with the formation.

It will further be observed that by this arrangement a selected portion of the torsion stem is fixedly held and secured to the formation or well bore for preventing rotation of the same; and applying torsional stresses during operation of the torsion stem to the well bore or formation rather than to the drill string tubing or other supporting means for the torsion stem assembly.

*Embodiment of FIGURES 27 and 28*

A still further important manner of applying the principles of this invention is disclosed in FIGURE 27 and 28. In this embodiment, a torsion stem is secured in selected position in a well bore by one or more supporting members, each of which in engaged with the torsion stem at a nodal point of torsional oscillation thereof; and whereby the application of a torsionally vibrating force applied to one or more positions upon a torsion stem are operative for producing torsional oscillatory movement of tools and implements applied to other portions of the torsion stem.

In a well bore 300 which is disposed in a formation 302, there is shown the lower end 304 of a drill string of tubing and to which is operatively connected the torsion stem 306 of the type hereinbefore set forth, this stem at its lower end being provided with a drill bit 308 which may be of any desired construction as set forth hereinbefore.

It is contemplated that in this embodiment, a heating means corresponding to the heating device 22 to which reference is made in the description of FIGURES 1–12, may be applied to the torsion stem. Since the function and operation of this element is however identical with that previously described, further description or illustration is deemed to be unnecessary and has been omitted in the interest of clarity.

At one or more of the nodal points of torsional oscillation of the drill stem, there are provided supporting and anchoring members in the form of packers 310. These packers may be of any desired and known construction and serve merely to secure the torsional stem in position in the formation and to limit as much as possible lateral flexing of the stem during its torsional oscillations. Conveniently, as shown more clearly in FIGURE 28, the packer may include an outer sleeve 312, provided with an axially extending slot 314 to impart resiliency to the sleeve, and provided with a plurality of vertically extending fins or ribs 316 for embedment in the wall of the well bore as shown in FIGURE 27 whereby the packer will be anchored against rotation. Disposed within and secured to the expansible sleeve 312 there is provided an expansible sleeve 318 of rubber or other suitable material and which is adapted to be laterally or radially expanded upon the application of a fluid pressure thereto from any suitable source, through the passage in the torsion stem, this pressure being applied through openings 320 in the torsion stem to an annular chamber 322 between the torsion stem and the sleeve 318. By this means, upon the application of pressure to the chamber 322 in the packer, the latter will be expanded into a secure anchoring and sealing engagement with the wall of the well bore. Preferably the expansible packer member 318 is adjustable longitudinally of the torsion stem, but upon expansion of the packer as set forth, will securely and fixedly grip the torsion stem to prevent longitudinal or rotational movement of the same.

By positioning the packers at nodal points, there is no twisting action of the torsion stem in the packers during torsional oscillation of the stem. Thus, a secure anchoring means is provided for the torsion stem during this operation.

At its upper end, or at other locations intermediate nodal points thereon, the torsion stem has mounted thereon a well drilling or conditioning tool, a reamer 324 being illustrated in FIGURE 27. Obviously, any other type of tool may be provided for any desired operation, the purpose of this arrangement being to utilize the energy of the torsional oscillations in the torsion stem to impart oscillatory movement to the tool 324. With the various implements mounted upon the torsion stem being disposed at locations intermediate nodal points, while the stem is surface supported at nodal points, it will be seen that oscillation applied to the stem will serve to produce oscillatory vibration to each of the implements, while there will be substantially no oscillatory movement at the nodal points. In this arrangement, it is contemplated that any or all of the tools may be given oscallatory impulses by the application of the pressure drilling medium thereto in the manner set forth hereinbefore in connection with the embodiment of FIGURES 1–12. Alternatively, one or more of the implements could be driven solely by the energy of the torsional oscillations which are imparted to the torsion stem at another implement thereon or from any other source.

Means may also be provided to serve the combined functions of enabling the raising and lowering of the torsion stem in the well bore; to allow for downward movement of the torsion stem and its assembly during the torsional drilling operation of the same; and to supply drilling fluid into the torsion stem. For this purpose there is provided a tail pipe 326 which is of relatively reduced diameter compared with that of the torsion stem and which is received in the lattter, and extends a substantial distance downwardly into the torsion stem. A bearing assembly 328 serves to rotatably journal the upper end of the torsion stem upon the tail pipe which serves as a pilot and guide for the stem. The tail pipe in turn is connected as by a coupling 330 to the end of the drill string tubing 304. A shoulder or projection 332 is provided upon the lower end of the tail pipe whereby upon raising the latter the entire torsion stem assembly may be lifted; but whereby a substantial amount of vertical movement of the torsion stem with respect to the tail pipe is allowed.

It will be seen that in this embodiment the torsion stem assembly functions as a complete drilling assembly except for the application thereto of drilling fluid through the tail pipe 326. It is contemplated that in the operation of this device, the torsion stem assembly will be lowered to the bottom of a well bore with the supporting packers properly positioned upon the torsion stem at nodal points, and with the tail pipe in its lowered position as shown in FIGURE 27. Fluid pressure is then applied to the interior of the torsion stem causing the packers to be expanded into anchoring engagement with the wall of the well bore. Upon further application of fluid pressure, the various drilling tools operatively connected with the drilling fluid will be rotated thus producing torsional oscillations in the torsion stem and performing the drilling operation. As the drilling progresses, the torsion stem assembly will move downwardly in the well bore, under its own weight, the fins or ribs 316 sliding vertically downwardly through the formation, until such time as the shoulder 332 approaches the bearing member 328 and the next tool such as the reamer 324 approaches a packing member 310. At that time it is necessary to reset the tool and again lower the tail pipe in the torsion stem in order that the drilling operation may be resumed.

The embodiment of FIGURES 23–26 disclose merely by way of exemplification of the principles thereof, one manner in which the torsion stem may be supported in a well bore; and whereby the operative length of the stem may be varied. Obviously, various other means could be employed for obtaining, to varying extents, the same general purposes and results.

From the description of the principles of the invention as hereinbefore set forth, it is now believed to be evident that the particular forms of drill bits may be employed with conventional drill stems and without the use of a torsion stem. When so employed, they will to a lesser extent produce a torsional oscillatory action in the drill string tubing, and this action will function in the manner set forth in detail in connection with the embodiment of FIGURES 1–12.

Still further, it is apparent that a conventional drill bit; or the drill bits herein disclosed but omitting the eccentric mountings of the roller cutters, may be used with a torsion stem interposed between the same and a drill string tubing to secure some of the advantages arising from the novel torsion stem arrangements herein disclosed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A drill comprising a head, a plurality of toothed roller cutters, journals on said head, an eccentric bearing rotatable on each of said journals, said roller cutters being each freely rotatable upon one of said eccentric bearings, said roller cutters being of different diameters and disposed in overlapping relation.

2. A drill comprising a head, a plurality of toothed roller cutters, journals on said head, an eccentric bearing rotatable on each of said journals, said roller cutters being each freely rotatable upon one of said eccentric bearings said roller cutters being of different diameters and disposed in overlapping relation, and fluid passage means in said head for directing fluid against said cutters.

3. The combination of claim 2 including an intermediate cutter between said roller cutters and extending across the center of said head.

4. The combination of claim 2 including an intermediate cutter between said roller cutters and extending across the center of said head, said intermediate tooth comprising a tapered roller.

5. The combination of claim 2 including an intermediate cutter between said roller cutters and extending across the center of said head, said intermediate cutter comprising a tapered roller, and an adjustable eccentric bearing means for supporting said intermediate cutter.

6. The combination of claim 2 wherein said roller cutters are of different diameters and disposed in overlapping relation including means for directing a fluid under pressure in driving relation against said roller cutters for rotating said roller cutters.

7. The combination of claim 2 wherein said roller cutters are of different diameters and disposed in overlapping relation including means for directing a fluid under pressure in driving relation against said roller cutters for rotating said roller cutters, and an intermediate cutter between said roller cutters and extending across the center of the head.

References Cited by the Examiner

UNITED STATES PATENTS

| | | | |
|---|---|---|---|
| 2,003,796 | 6/1935 | Sperry | 175—350 X |
| 2,020,625 | 11/1935 | Thaheld | 175—370 X |
| 2,050,988 | 8/1936 | Zublin | 175—96 |
| 2,184,065 | 12/1939 | Zublin | 175—96 |
| 2,204,657 | 5/1940 | Brendel | 173—336 X |
| 2,271,005 | 1/1942 | Grebe | 1—1942 |
| 2,930,586 | 3/1960 | Long | 175—57 |
| 2,948,514 | 8/1960 | Long | 175—57 |
| 3,062,303 | 11/1962 | Shultz | 175—61 |
| 3,070,181 | 12/1962 | Graham | 175—331 |
| 3,078,934 | 2/1963 | Graham et al. | 175—331 |

CHARLES E. O'CONNELL, *Primary Examiner.*

JACOB L. NACKENOFF, *Examiner.*

R. E. FAVREAU, *Assistant Examiner.*